May 26, 1959 J. A. HUGGINS 2,888,296
SUBURBAN VEHICLE
Filed Oct. 3, 1955 5 Sheets-Sheet 1
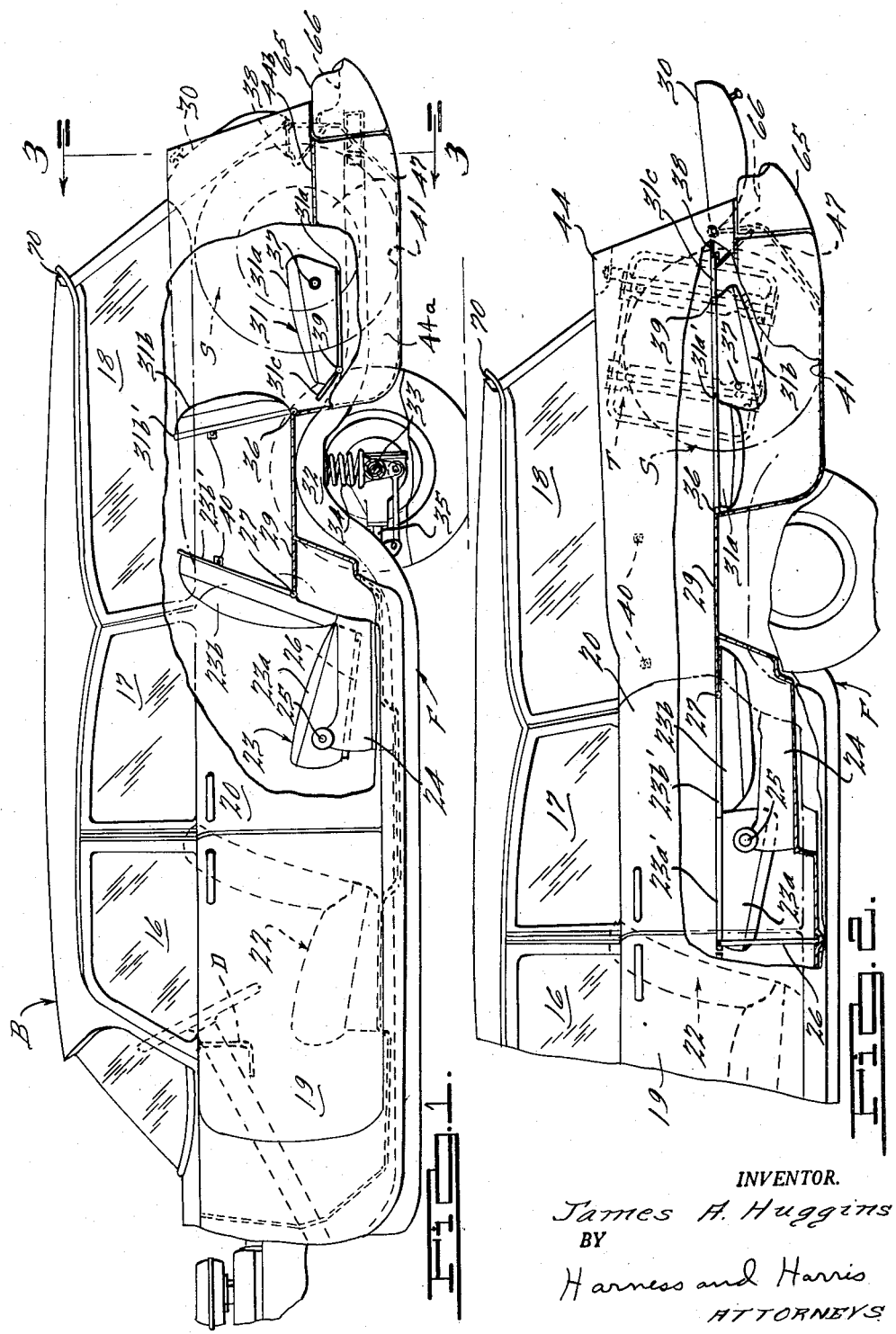
INVENTOR.
James A. Huggins
BY
Harness and Harris
ATTORNEYS

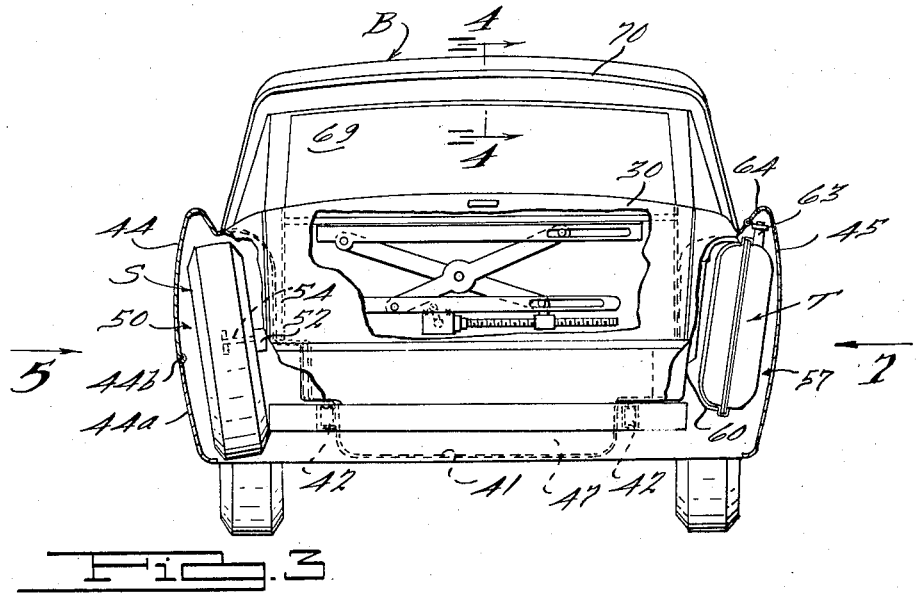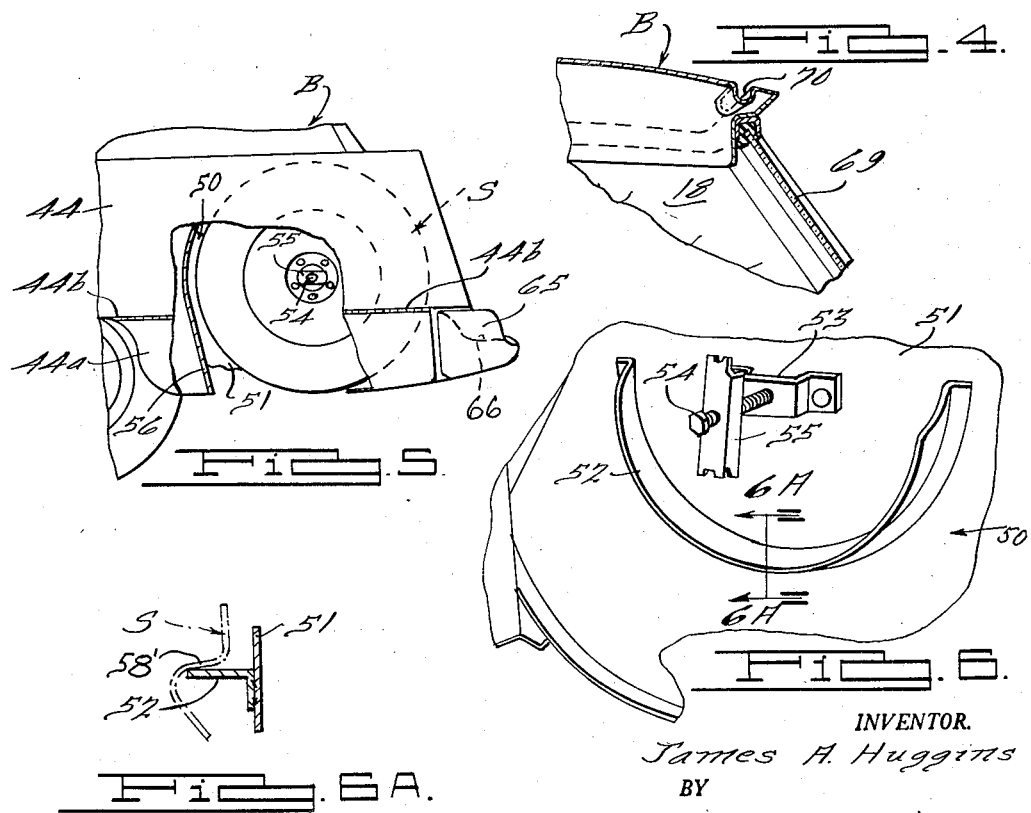

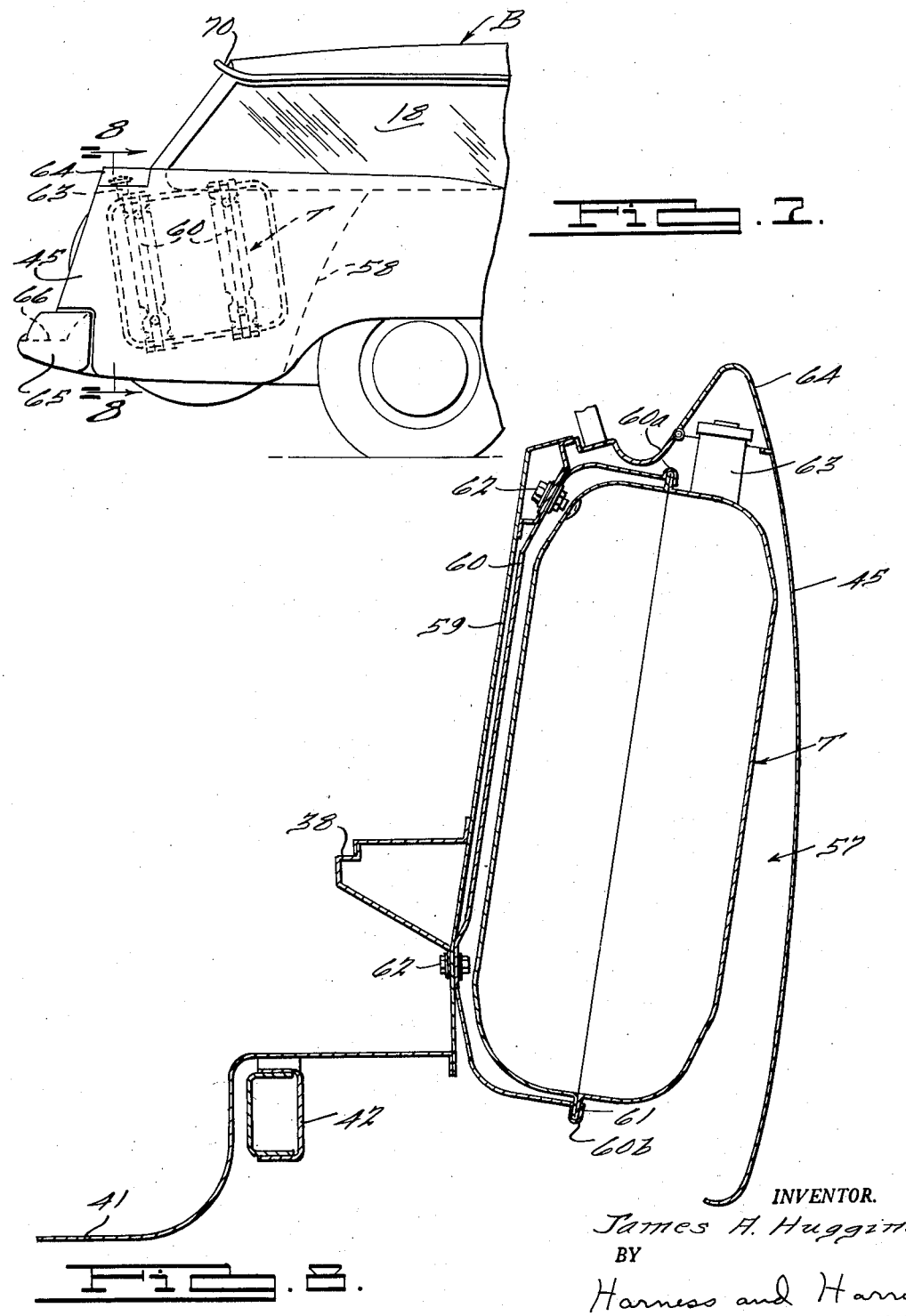

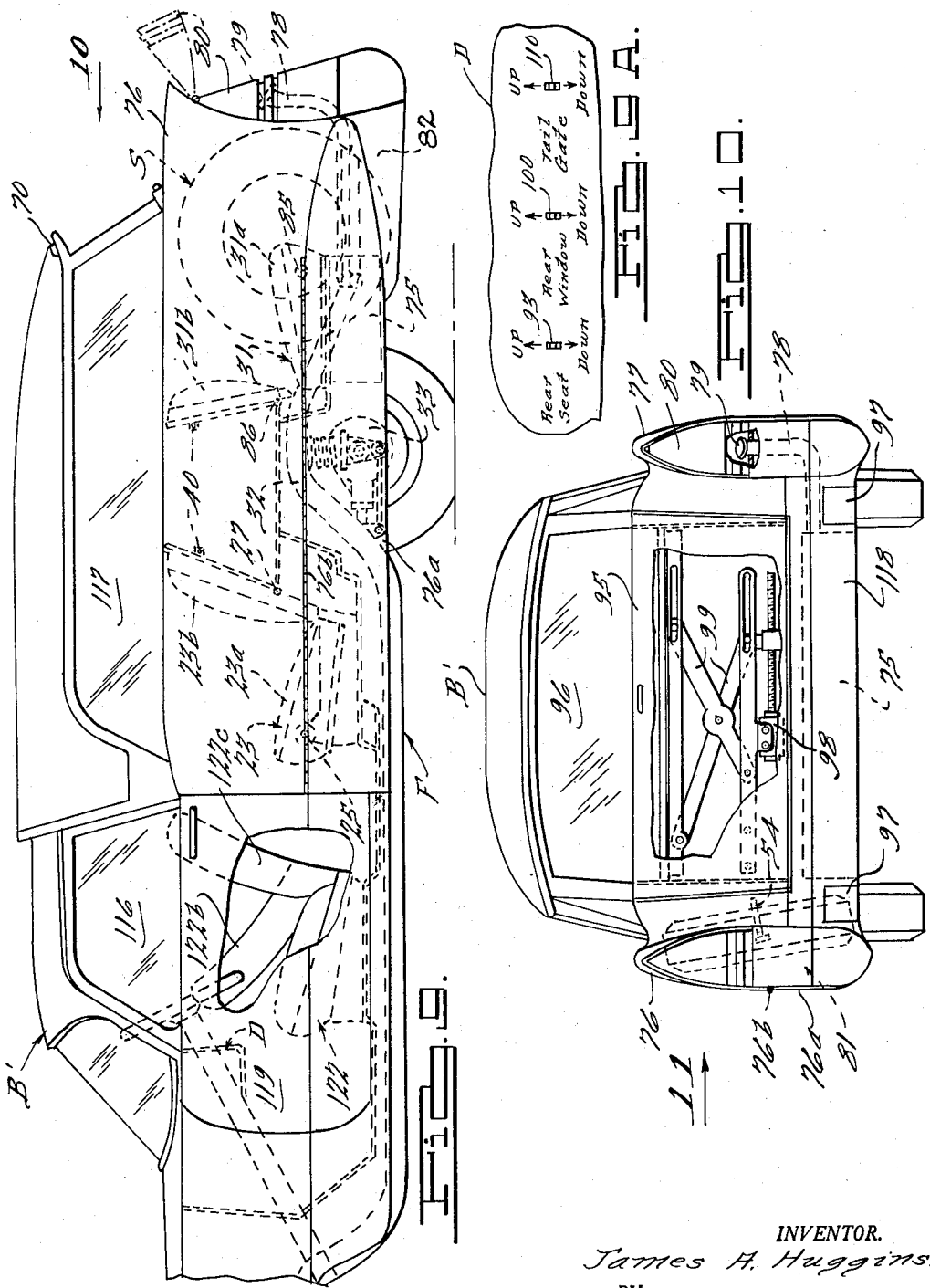

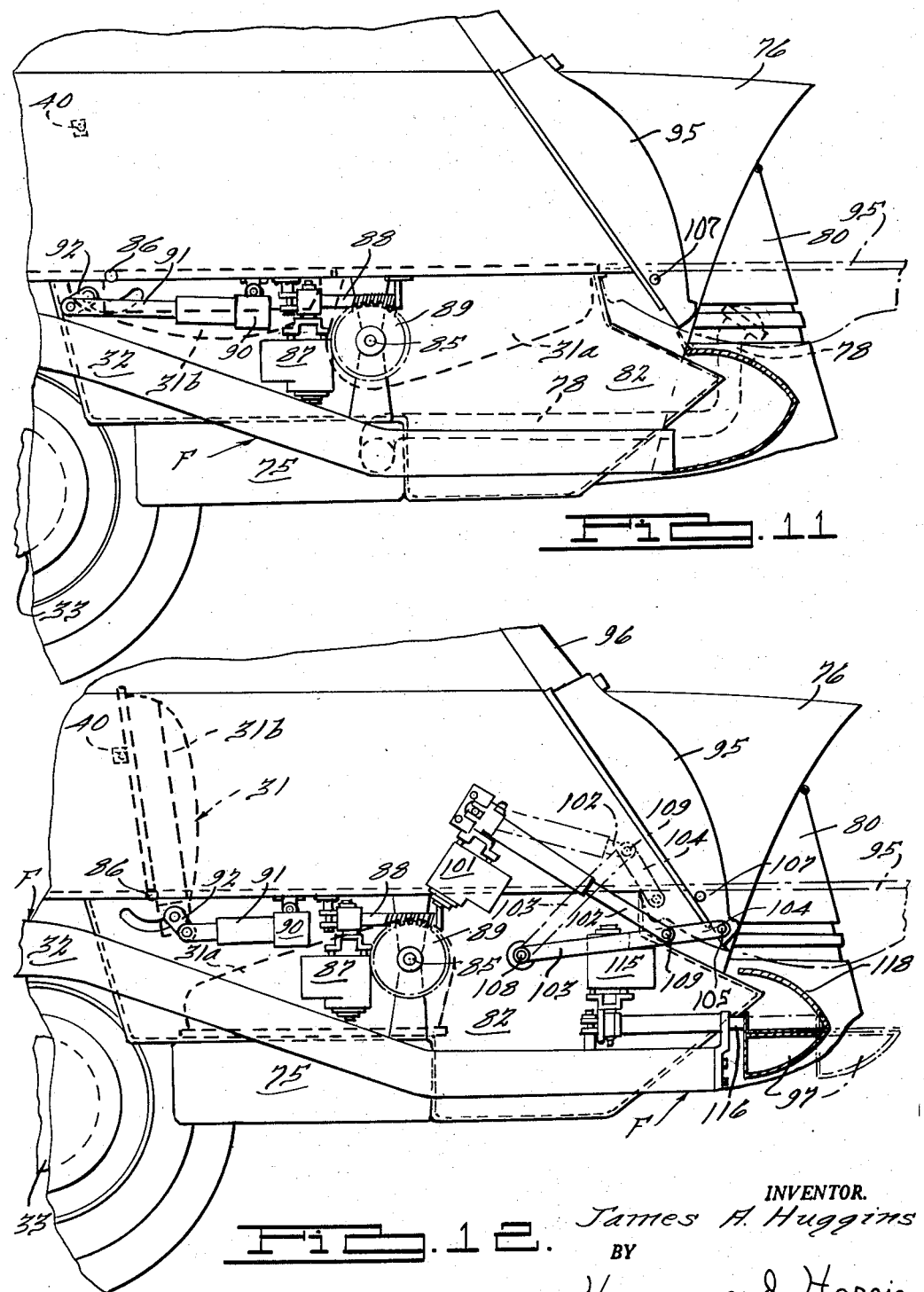

United States Patent Office 2,888,296
Patented May 26, 1959

1

2,888,296

SUBURBAN VEHICLE

James A. Huggins, Detroit, Mich., assignor to Chrysler Corporation, Highland Park, Mich., a corporation of Delaware Application October 3, 1955, Serial No. 538,150

6 Claims. (Cl. 296—24)

This invention relates to that class of motor vehicles commonly referred to as suburban vehicles, station wagons, ranch wagons, and the like, and is concerned primarily with the design of such vehicles such that their overall height may be reduced, the seating and load capacity increased, the comfort of the passengers improved, and the styling of the vehicle utilized to position the vehicle engine fuel tank and the vehicle spare wheel in new and improved locations.

It is a primary object of this invention to provide a suburban vehicle of conventional wheel base dimensions that is arranged to comfortably seat nine (9) passengers while providing a vehicle height of exceedingly low dimensions.

It is another object of this invention to provide a suburban vehicle of conventional wheel base dimensions having three (3) full width seats each of which can be entered without requiring the passengers to pass through or across either of the other seat units.

It is still another object of this invention to provide a multi-passenger suburban vehicle having the engine fuel tank and the vehicle spare wheel arranged in novel locations such that a third full width passenger seat may be arranged within a vehicle body to give maximum passenger seating and comfort within a conventional wheelbase vehicle.

It is a further object of this invention to provide novel means for mounting and supporting a vehicle spare wheel within a portion of a vehicle fender.

It is a further object of this invention to provide novel means for supporting a vehicle fuel tank within a portion of a vehicle fender.

It is still another object of this invention to provide a passenger seating arrangement within a conventional wheelbase vehicle body that permits the use of three full width seat units each located at substantially the same horizontal level and each of which can be reached by the occupants thereof without passing through or across any other seat unit.

It is still another object of this invention to provide a closed body motor vehicle having the roof thereof formed with edge portions that are located inwardly of the vehicle floor perimeter, said edge portions having a combination hand hold and drainage trough formed thereon to prevent drainage onto the underlying vehicle floor portions.

It is still another object of this invention to provide a three-seat station wagon seating arrangement that will insure adequate head room for all vehicle passengers without the use of a raised clearance bubble in portions of the vehicle roof.

Other objects and advantages of this invention will become readily apparent from a reading of the following description thereof and a consideration of the related drawings wherein:

Fig. 1 is a fragmentary side elevational view, partly in section, of a motor vehicle embodying this invention;

Fig. 2 is an elevational view, similar to Fig. 1, but

2 showing the vehicle seats rearranged to provide the maximum load carrying capacity;

Fig. 3 is a rear elevational view, partly in section, of the vehicle shown in Figs. 1 and 2, this view being taken along the line 3—3 of Fig. 1;

Fig. 4 is a fragmentary, sectional elevational view taken along the line 4—4 of Fig. 3;

Fig. 5 is a fragmentary, side elevational view of the left rear quarter of the vehicle shown in Figs. 1–3, the view being taken in the direction of the arrow 5 of Fig. 3;

Fig. 6 is an enlarged fragmentary sectional elevational view of the means for mounting a spare wheel within the vehicle fender compartment;

Fig. 6A is a fragmentary sectional elevational view taken along the line 6A—6A of Fig. 6;

Fig. 7 is a fragmentary side elevational view of the right rear quarter of the vehicle shown in Figs. 1–3, the view being taken in the direction of the arrow 7 of Fig. 3;

Fig. 8 is an enlarged sectional elevational view taken along the line 8—8 of Fig. 7;

Fig. 9 is a side elevational view of a motor vehicle embodying a modified form of this invention;

Fig. 9A is a fragmentary elevational view of that portion of the dashboard of the vehicle shown in Fig. 9 that includes the control switches for the power operated tailgate, tailgate window and rear seat of this vehicle.

Fig. 10 is a rear end elevational view, with parts broken away and in section, of the vehicle shown in Fig. 9, the view being taken in the direction of arrow 10 of Fig. 9;

Fig. 11 is an enlarged, fragmentary, side elevational view of the rear quarter of the vehicle shown in Figs. 9 and 10, the view being taken in the direction of the arrow 11 of Fig. 10 with certain parts of the vehicle body being broken away for the sake of clarity; and Fig. 12 is a view similar to Fig. 11 but showing a rearrangement of certain of the body mounted elements.

The public's recognition of the multi-purpose function of a suburban type vehicle as well as the present trend towards the establishment of residences in the suburban areas adjacent the metropolitan area where one's business may be carried on have been a few of the factors that have materially increased the popularity of the so-called suburban type vehicle. This type of vehicle now more than ever is required to serve the dual purpose of a passenger carrier and a load carrier. At the same time that the suburban vehicle is increasing in popularity the general trend in vehicle styling is towards lower and longer vehicles. It has been the desire of the motor vehicle builders to provide suburban type vehicles that stylewise resemble, as closely as possible, current passenger vehicles while at the same time preventing the sacrifice of any of the load carrying advantages of the suburban vehicle. Larger families and the increased participation in group activities has placed a premium on a passenger car styled suburban type vehicle with the maximum seating capacity and comfort and the maximum load carrying capacity. The desire for maximum seating capacity in a conventional wheel base vehicle at the same time that vehicle silhouettes are becoming lower and longer has presented a perplexing problem that has been solved in a novel manner by this invention.

Heretofore, in conventional wheelbase, suburban type, vehicles that have three rows of seats, it has been possible to seat a maximum of eight (8) passengers and this could only be accomplished if the headroom above the rear or third seat was restricted. The rear or third seat of such vehicles is elevated with respect to the two forwardly positioned seats such that the headroom above the third or rear seat is restricted. The reason why the third or rear seat, in prior suburban designs, has been elevated with respect to the forwardly positioned seats, is due to the fact that the rear or third seat has been positioned over the rear axle and at such a location the chassis frame is formed with a "kick-up" to provide for vertical oscillation of the rear axle carrier. The rear or third seat could not be moved rearwardly of its position over the rear axle "kick-up" in prior designs because the "kick-up" interfered with the required leg room for the third seat. Furthermore, the spare wheel has usually been mounted beneath the floor at the rear end of suburban vehicles of prior designs and positioning of the third or rear seat at the extreme rear end of the vehicle in prior designs would have interfered with the accessibility to the spare wheel. Also, the floor at the rear end of suburban vehicles of prior designs is often required to be elevated with respect to the floor forwardly of the third or rear seat because the engine fuel tank and the tool storage compartment are often located beneath the floor at the extreme rear end of a suburban type vehicle.

This invention overcomes the problems heretofore presented when three rows of seats were installed in a suburban-type, conventional wheelbase vehicle by first facing the third or rear seat rearwardly, second, locating the third or rear seat rearwardly of the chassis frame rear axle "kick-up," third, lowering the floor at the rear end of the vehicle to provide adequate leg and foot room for the third seat by removal of the engine fuel tank, spare wheel and tool compartment from this area, fourth, increasing the vehicle body interior space by providing for the storage of the spare wheel and the engine fuel tank in the rear portions of the fin-type rear fenders, and fifth, providing three full width passenger seats each capable of seating three (3) persons and arranging these seats such that entrance to the rear or third seat is through the tailgate opening at the rear end of the vehicle rather than by way of the vehicle side doors. These various features and their advantages will become more apparent from a consideration of the figures of the drawings that are hereafter described.

Fig. 1 shows the body B of a four-door suburban-type vehicle. The body B may be considered to enclose a front or driver's compartment 16, a middle compartment 17 and a rear compartment 18. Entrance to the front compartment 16 is made through one of the front doors 19, entrance to the middle compartment 17 is made by way of one of the rear doors 20 and entrance to the rear compartment 18 is made by way of the tailgate opening at the rear end of the vehicle as will be subsequently described.

Mounted within the driver's compartment 16 is a full width, three passenger, unit seat 22. Mounted within the middle compartment 17 is a full width, three passenger, folding, middle seat 23 composed of a pivotally mounted seat section 23a and a pivotally mounted back section 23b. Seat section 23a is pivotally mounted on a base frame 24 by pivot means 25 that permit the seat section 23a to be folded from its upright position of Fig. 1 to its forwardly inverted position as shown in Fig. 2. When the seat section 23 is inverted as shown in Fig. 2, then its underside 23a' forms the forward portion of the floor for the load carrying compartment that extends rearwardly from the back of the front seat 22 to the tailgate 30. The seat section 23a is supported in its Fig. 2 inverted position by suitable support legs 26 that may be pivotally mounted on the side edges of the seat section 23a. The back section 23b of the middle seat 23 is mounted on fixed pivot means 27 such that the back section 23b may be folded forwardly to an inverted horizontal position as shown in Fig. 2. The back 23b' of the back section 23b has its lower end portion arranged so that it can swing up and abut against the underside of the permanent floor panel 29 that extends between the back of the middle seat 23 and the back 31b of the rear seat 31.

The rear seat 31 is arranged to face rearwardly and it is positioned rearwardly of the "kick-up" 32 in the chassis frame F. "Kick-up" 32 permits the rear axle and differential carrier 33 to oscillate vertically on compression and expansion of the chassis frame suspension springs 34. Differential carrier 33 is connected to the vehicle drive train propeller shaft 35 in the conventional manner. The rear seat 31 comprises the pivotally mounted back section 31b and the pivotally mounted seat section 31a. Back section 31b is mounted on the fixed pivot 36 so that it may be folded rearwardly and downwardly to the position shown in Fig. 2. Back section 31b is never folded down until after the seat section 31a has first been rotated rearwardly about its fixed pivot 37 to the inverted position shown in Fig. 2. It will be noted that the seat section 31a carries a hingedly connected rigid flap 31c at its underside rear edge. This rigid flap 31c is arranged to matingly engage in a stepped flange portion 38 of the permanent flooring that extends across the extreme rear end of the vehicle rear compartment 18. A hinge 39 connects the flap 31c to the rear seat section 31a. Hinge 39 cooperates with the floor section step 38 to anchor the inverted rear seat section 31a in a horizontal position so that it will be in alignment with the horizontal portion of the permanent floor section 29. The underside of the rear seat section 31a is formed with a step 31a' along its front edge which step provides a seat to receive the top edge 31b' of the rear seat back section 31b when this back section is folded rearwardly and downwardly to the inverted position shown in Fig. 2. The side walls of the vehicle body B may include suitable snap catches 40 that engage mating formations on the middle and rear seat back sections 23b and 31b to assist in retaining the back sections 23b and 31b in their passenger supporting positions.

From a consideration of the foregoing description and Figs. 1 and 2, it is thought to be obvious that facing the rear seat 31 rearwardly and placing the rear seat 31 rearwardly of the chassis frame "kick-up" 32 permits the rear seat 31 to be at the level of the front and middle seats 22 and 23. From a consideration of Figs. 1 and 2, along with Fig. 3, it will also be apparent that in a vehicle of the type disclosed there is ample leg and foot room rearwardly of the rear seat 31 to provide the necessary comfort for the rear seat passengers. Fig. 3 clearly shows that the permanent floor 41 at the rear end of the vehicle rearwardly of rear seat 31 is located below the chassis frame side rails 42 and that this floor is clear of any obstructions such as the engine fuel tank and the vehicle spare wheel that are usually mounted at this location. As clearly shown in Figs. 3 and 5–8, this invention provides for the mounting of the engine fuel tank and the vehicle spare wheel in the rear fenders of the vehicle body B. From Figs. 1, 2, 5 and 7 it will be noted that this suburban-type vehicle has so-called "finned" rear fenders 44 and 45 that provide considerable, normally unused, enclosed space rearwardly of the rear ground wheels that are partially housed within these fenders. Rather than let this large fender encased space be unoccupied, the engine fuel tank T and the vehicle spare wheel S are arranged to be housed within the rear portions of the finned rear fenders and this is one of the chief reasons why the rearwardly facing rear seat 31 is provided with adequate foot and leg room for the passengers thereof. From Figs. 3 and 7, it will be noted that the right rear fender 45 houses the fuel tank T while the left rear fender 44 houses the spare wheel S.

Figs. 5 and 6 clearly show that the left rear fender 44 has a compartment 50 at the rear end thereof that is of sufficient capacity to practically completely house the spare wheel S. Mounted in the compartment 50 on the vehicle body side wall 51, that forms the inner wall of the fender 44, is a semi-circular, rim-type, bracket 52. Bracket 52 is adapted to receive and support a mating portion 58' of the spare wheel S. Also mounted on the inner fender wall 51 is a bracket 53 that has a threaded bore therein to receive a cleat bolt 54. Rotatably mounted on the shank of cleat bolt 54 is a cleat 55. Cleat 55 is adapted to bridge the central opening 56 in the web of the spare wheel S and to be drawn up tight against the wheel web to lock the wheel S on its mounting bracket 52. A partition 56 is mounted in compartment 50 to prevent the left road wheel from discharging water, dirt, mud and other foreign matter on the stored spare wheel S.

In order to facilitate mounting and demounting of the spare wheel S on its mounting bracket 52, it has been found quite advantageous to form the outer side of the left rear fender 44 with a hingedly mounted lower flap section 44a. The flap section 44a is connected to the upper main portion of the fender 44 by means of an elongated hinge strip 44b. The hinge strip 44b is arranged to be concealed by a conventional fender trim strip or by locating the hinge 44b in a crease line in the rear fender 44. Whenever the spare wheel S is to be used it is a simple matter to fold the hinge flap 44a outwardly and upwardly to uncover the spare wheel S. The spare wheel S may then be unbolted from the brackets 52, 53 and readily removed from its position within the fender. The mounting of the spare wheel S in the fender, rather than beneath the floor of the load carrying compartment as is quite common in present suburban-type vehicles, permits the changing of wheels and tires without requiring the removal of any of the load from the load carrying compartment. While the disclosed spare wheel mounting is of particular advantage in suburban-type vehicles, still, it also gives quite an advantage when used in passenger cars of all types for it removes the spare wheel from the rear deck luggage compartment and makes considerably more space available for luggage storage while eliminating the need for removal of any of the luggage from the luggage compartment prior to initiating the interchange of a vehicle wheel with the spare wheel.

Figs. 7 and 8 of the drawings clearly show the mounting of the motor vehicle engine fuel tank T in the rear interior portion of the right rear fender 45. The fin-type fender 45 provides more than ample room to conceal the fuel tank T. The compartment 57 formed within the rear fender 45 may be divided by a partition 58 into a front compartment housing the right rear wheel and a rear compartment that houses the fuel tank T. The partition 58 serves as a guard or shield to prevent the right rear wheel from discharging damaging objects against the fuel tank T. Fuel tank T is of a flat box-like configuration and it is supported on the fender interior wall 59 by means of a pair of strap-type mounting bars, 60, 60. The straps 60, 60 have their opposite ends 60a and 60b clinched about the central flanged seam 61 of the fuel tank T. Each of the mounting bars 60 is securely bolted to the fender interor wall 59 by the bolt connectors 62, 62. Fuel tank T has a capped fill spout 63 at its upper end. The tank fill spout 63 is located beneath a hinged port 64 formed in the upper rear portion of the fender 45. It will be noted from Fig. 8 that any overflow of the fuel tank T is free to run off to the ground beneath the fender without flowing across the vehicle body exterior surface where it might cause objectionable staining or the like.

A consideration of Figs. 1 and 2 will point out that the outer ends of the rear bumper bar 65 are each formed with a depressed step formation 66. These step formations 66 are accessible even when the tailgate 30 (see Fig. 2) is in lowered position. When one desires to enter the rear seat 31 of the vehicle body B, it is advisable to first lower the tailgate window 69 to its retracted position within the tailgate. Next the tailgate 30 is lowered from its Fig. 1 raised position to its Fig. 2 lowered position. Next the person desiring to occupy the rear or third seat 31 plants one foot on one of the bumper bar steps 66 and steps up so as to place the other foot on the top of lowered tailgate 30. During this ascendency of the rear seat passenger to the top of the tailgate 30 the passenger can steady himself by placing one or both hands on the handrail groove 70 (see Fig. 4) that is formed across the rear end of the vehicle body roof. It will be noted from Figures 1 and 2 that the rear end of body B slopes upwardly and forwardly. This forward slope of the rear end of body B places the rear edge 70 of the body roof considerably forward of the rear end of the floor 41 of the rear seat well 47. As a result of this arrangement it is possible for the rear seat passengers to stand erect at the rear end of the body well 47 without interference from the body roof and this materially facilitates mounting to and demounting from the rear seat 31.

Figs. 9–12 show a modified form of this invention wherein the seating arrangement is identical to that shown in Figs. 1 and 2 but wherein certain structural modifications have been incorporated. In the modified form of this invention shown in Figs. 9–12, the body B' is a two-door unit. The body B' has a pair of doors 119 located at opposite sides of the front or driver's compartment 116. Located in the driver's compartment 116 is a split back front seat 122 that has a pair of pivotally mounted back sections 122b and 122c. From Fig. 9 it is obvious that each of the back sections 122b and 122c may be folded forwardly to permit passengers to enter the rear compartment 117 of the vehicle body B' and sit upon the middle or second seat 23. Entrance to the rear of the compartment 117 by the passengers for the third or rear seat 31 is by way of the tailgate opening at the rear end of the body B'. Tailgate 95, see Figs. 10 and 12, can be lowered after its window 96 has been retracted within the tailgate by the electric motor operated window control mechanism 99. In its lowered horizontal position, see Fig. 12, the tailgate 95 provides a step for mounting into the rear end of the body compartment 117.

The two door suburban body B' is supported on a chassis frame F that has a "kick-up" portion 32 (see Figs. 11 and 12) above the rear wheel axle carrier 33. The "kick-up" 32 is located between the middle and rear seats 23 and 31 respectively. In this form of the invention the engine fuel tank 75 is located beneath the seat section 31a of the rear seat 31 rather than being located in one of the enlarged, fin-type, rear fenders 76 or 77. The filter pipe 78 for the fuel tank 75 extends rearwardly from the tank 75 and has its fill port or mouth 79 located beneath a hinged tail light door element 80 that forms a part of the rear end portion of the right rear fender 77. The left rear fender 76 has a hingedly mounted lower flat portion 76a connected thereto by a hinge 76b so as to provide a movable closure member for the storage compartment 81 located within the left rear fender 76. In the fender compartment 81 is located a spare wheel mounting bolt 54 similar to that shown in Figs. 5 and 6 so that the vehicle spare wheel and tire may be housed within the rear portion of the compartment 81. By mounting the spare wheel S within the left rear fender 76 and by placing the engine fuel tank 75 beneath the rear or third seat 31, it is possible to provide a large well 82 across the rear portion of the vehicle body B' that is of such size that it provides the necessary foot and leg room for the rearwardly facing passengers of the third or rear seat 31. This well 82 is possible because of the particular arrangement of elements shown in the several forms of this invention herein disclosed.

As will be noted particularly from Figs. 9, 11 and 12, the rear seat 31 is composed of a pivotally mounted seat section 31a that is supported on the fixed pivot 85, and a pivotally mounted back section 31b that is supported on the fixed pivot 86. Both the seat sections 31a and 31b are adapted to be electric motor operated. The electric motor 87, that is mounted in an interior compartment of one of the rear fenders 76 or 77, is drivingly connected to a screw shaft element 88 to effect rotation thereof. Screw 88 meshes with a gear 89 that is drivingly connected to the pivotally mounted seat section 31a. Rotation of screw 88 in one direction by motor 87 will cause the gear 89 to rotate the seat section 31a between its normal seating position, as shown in Figs. 9 and 12, to its inverted load carrying position as shown in Fig. 11. Rotation of shaft 88 in the opposite direction can be obtained by reversing motor 87. A second reversible electric motor 90 is adapted to reciprocate the thrust link 91. Link 91 is connected to a lever arm 92 that is fixedly mounted on the lower end of pivotally mounted seat back section 31b. When it is desired to fold the rear seat 31 from its passenger supporting position, as shown in Figs. 9 and 12, to its load carrying position, as shown in Fig. 11, it is merely necessary to press the dashboard mounted lever 93 (see Fig. 9A) to the down position. This will first energize motor 87 and cause the motor 87 to rotate the screw 88 and invert the rear seat section 31a to the load carrying position shown in Fig. 11. After the seat section 31a has reached its fully inverted position (Fig. 11) then a circuit (not shown) is automatically closed to the second motor 90 and the thrust link 91 is extended forwardly so as to rotate the seat back section 31b rearwardly to its horizontal, load carrying position (see Fig. 11). The reverse sides of the seat and back sections 31a and 31b now form a co-planar surface that will be aligned with the reverse sides of the middle seat sections 23a and 23b when the middle seat is inverted (see Fig. 2).

Not only are the rear seat sections 31a and 31b electric motor operated, but also under power control are the tailgate 95, the tailgate window 96, and the retractible tailgate mounting steps 97. Mounted in the tailgate 95 (see Fig. 10) is an electric motor 98 that actuates a scissors-type tailgate window operating mechanism 99. A switch 100 (Fig. 9A) mounted on the vehicle dashboard D controls energization of the tailgate window operating motor 98. The wiring circuit (not shown) for the window operating motor 98 is such that not until the tailgate window 96 is completely retracted within the tailgate 95 can the circuit (not shown) for actuating the tailgate motor 101 be energized.

Motor 101 is arranged to actuate the tailgate 95 between open and closed positions. The tailgate motor 101 is mounted within an interior compartment of one of the fin-type rear fenders 76 and 77. Motor 101 is connected (see Fig. 12) by suitable linkage 102, 103, 104 to the pin 105 that is fixed on the lower end of the hinged tailgate 95. Tailgate 95 is hingedly connected to the rear end of the vehicle body B' by a suitable hinge element 107. This hinge 107 may be of the torsion bar type to provide a built-in counterbalance effect as is well-known in tailgate hinging mechanisms. As will be seen from Fig. 12, the tailgate motor 101 is arranged to reciprocate the thrust link 102. The outer free end of thrust link 102 is connected to the free end of the pivot link 103. A fixed pivot 108 anchors the other end of pivot link 103 to the body B'. Also connected to the links 102 and 103 by pivot pin 109 is the short connector link 104. Connector link 104 transmits the motion of the thrust link 102 to the tailgate 95 by way of the eccentrically positioned pivot pin 105. The solid lines in Fig. 12 show the tailgate actuating linkage in tailgate closed position. The broken lines in Fig. 12 show the tailgate actuating linkage in tailgate open position. To control raising and lowering of the tailgate 95, after the window 96 has been retracted within the tailgate 95, there is provided a dashboard mounted switch 110 (see Fig. 9A). Switch 110 will effect reversible operation of the motor 101 when it is moved between its two motor energizing positions.

Also mounted within one of the rear fender interior compartments is another electric motor 115. Motor 115 is arranged to reciprocate the thrust linkage 116 that carries the retractible tailgate mounting steps 97. Steps 97 (see Fig. 12) are mounted on slideways (not shown) carried by the rear bumper 118. A step 97 is positioned outboard of or at each of the sides of the tailgate 95 so that when the tailgate 95 is lowered to a horizontal position the steps 97 are readily accessible to facilitate passenger mounting of or demounting from the tailgate 95 at either side of the vehicle. The control circuit (not shown) for the step operating motor 115 is preferably arranged to be automatically controlled by the movement of the tailgate 95 to and from its horizontal position. Obviously the steps 97 could be controlled independently of the tailgate operation by a separate switch similar to the control switches 93, 100 and 110.

I claim:

1. In a motor vehicle comprising a closed body supported on a chassis frame having an axle receiving kick-up adjacent the rear end thereof, at least one full width passenger seat extending crosswise of said body forwardly of said kick-up, another crosswise extending, full width, seat rearwardly of said chassis frame kick-up, the seat forwardly of said chassis frame kick-up facing forwardly and the seat rearwardly of the chassis frame kick-up facing rearwardly, said body having a full width, depressed well extending crosswise of the body rearwardly of said rear seat to provide adequate leg and foot room for the rear seat passengers, the rear end of said body being formed as a movable closure member to provide a passenger entrance to said rear seat through the rear end of said body, and said vehicle body having the roof thereof terminating forwardly of the rear end of said well so that the rear seat passengers may stand erect in the rear portion of said well without interference from said roof when said closure member is in open position, said roof being formed along the rear edge thereof with a depressed groove that provides a passenger handrail and a moisture drainage trough.

2. In a motor vehicle comprising a body supported on a chassis frame having an axle receiving kick-up adjacent the rear end thereof, a rearwardly facing, full width, passenger seat extending crosswise of the body at the rear of said chassis frame kick-up with the seating surface of said seat positioned at or below the top of said chassis frame kick-up, a full width well extending crosswise of the body rearwardly of said rear seat to provide adequate leg and foot room for the rear seat passengers, the rear end of said body being provided with a hingedly mounted closure member arranged to swing between an extended, substantially horizontal position and a retracted, substantially vertical position so as to provide a passenger entrance to said rear seat through the rear end of said body, step means movably mounted on the rear end of said body for extension from a concealed retracted position to an extended exposed position to provide means for passenger mounting to and demounting from said well, and power operated means to effect movement of said closure member and said steps between extended and retracted positions.

3. In a motor vehicle comprising a body supported on a chassis frame having an axle receiving kick-up adjacent the rear end thereof, a forwardly facing, folding, full width, passenger seat extending crosswise of the body forwardly of said chassis frame kick-up, a rearwardly facing, folding, full width, passenger seat extending crosswise of the body at the rear of said chassis frame kick-up, the seating surfaces of said seats being positioned at or below the top of said chassis frame kick-up, a full width well extending crosswise of the body rearwardly of said rear seat to provide adequate leg and foot room for the rear seat passengers, the rear end of said body being provided with a hingedly mounted closure member arranged to swing between a substantially horizontal and a substantially vertical position to provide a passenger entrance to said rear seat through the rear end of said body, extensible step means mounted on the rear end of said body for movement between concealed and exposed positions to provide means for passenger mounting to and demounting from said well, and power operated means to effect folding and unfolding of at least one of the folding seats and to actuate the closure member and the extensible step means.

4. A motor vehicle comprising a body supported on a chassis frame having a floor covered, axle receiving, kick-up adjacent the rear end thereof, said body having a plurality of longitudinally spaced, full width passenger seat units extending crosswise thereof in front of said kick-up and another crosswise extending, full width seat unit behind said chassis frame kick-up with the seat unit cushion surfaces positioned at or below the floor of said chassis frame kick-up, the seat units forwardly of said chassis frame kick-up facing forwardly and the seat unit rearwardly of the chassis frame kick-up facing rearwardly, the seat units immediately adjacent each side of the chassis frame kick-up each having a cushion section pivotally mounted on said body adjacent the cushion forward edge and a back section pivotally mounted on said body adjacent the back lower edge whereby said seat unit sections may be inverted about fixed pivots to provide a load floor coplanar with the kick-up floor, said body having a well extending thereacross rearwardly of and below said chassis frame kick-up to provide adequate leg and foot room for the rear seat passengers, said well providing a storage space for the foldable sections of the rearwardly facing seat unit when said seat unit sections are inverted to provide a load floor, and the rear end of said body having a hingedly mounted tailgate to provide a passenger entrance to said rear seat through the rear end of said body, said hingedly mounted tailgate being movable about an axis extending crosswise of the body between a substantially vertical and a substantially horizontal position, said body being formed with step portions that cooperate with said tailgate, when said tailgate is in a horizontal position, to provide passenger access means to said rear seat.

5. A motor vehicle comprising a body supported on a chassis frame having a floor covered axle receiving kick-up adjacent the rear end thereof, said body having first and second longitudinally spaced apart, full width, passenger seat units extending crosswise of the body forwardly of said kick-up and a third crosswise extending, full width, seat unit rearwardly of said chassis frame kick-up with the seat unit cushion surfaces positioned at or below the floor of said chassis frame kick-up, the seat units forwardly of said chassis frame kick-up facing forwardly and the seat unit rearwardly of the chassis frame kick-up facing rearwardly, the seat units immediately adjacent each side of the chassis frame kick-up each having a cushion section pivotally mounted on said body adjacent the cushion forward edge and a back section pivotally mounted on said body adjacent the back lower edge whereby said seat unit sections may be inverted about fixed pivots to provide a load floor coplanar with the kick-up floor, said body having full width wells in the floor thereof immediately adjacent each side of said chassis frame kick-up to provide stowage wells to receive the foldable seat unit back and seat sections when the seat unit sections are inverted, and a movable closure member for the rear end of said body to provide passenger access to and from said third seat unit.

6. A motor vehicle comprising a body supported on a chassis frame having a floor covered axle receiving kick-up adjacent the rear end thereof, said body having first and second longitudinally spaced apart, full width, passenger seat units extending crosswise of the body forwardly of said kick-up and a third crosswise extending, full width, seat unit rearwardly of said chassis frame kick-up with the seat unit cushion surfaces positioned at or below the floor of said chassis frame kick-up, the seat units forwardly of said chassis frame kick-up facing forwardly and the seat unit rearwardly of the chassis frame kick-up facing rearwardly, the seat units immediately adjacent each side of the chassis frame kick-up each having a cushion section pivotally mounted on said body adjacent the cushion forward edge and a back section pivotally mounted on said body adjacent the back lower edge whereby said seat unit sections may be inverted about fixed pivots to provide a load floor coplanar with the kick-up floor, said body having full width wells in the floor thereof immediately adjacent each side of said chassis frame kick-up to provide stowage wells to receive the foldable seat unit back and seat sections when the seat unit sections are inverted, and a movable closure member for the rear end of said body to provide passenger access to and from said third seat unit, at least one of said rearmost seats including power operated means to effect movement of its seat and back sections between passenger seating and inverted, load carrying positions.

References Cited in the file of this patent

UNITED STATES PATENTS

| Re. 24,416 | Walker | Jan. 14, 1958 |
| 1,749,112 | Russell | Mar. 4, 1930 |
| 1,894,103 | Kuenzel | Jan. 10, 1933 |
| 2,131,306 | Walker | Sept. 27, 1938 |
| 2,433,169 | Stephenson et al. | Dec. 23, 1947 |
| 2,563,981 | Walker | Aug. 14, 1951 |
| 2,677,574 | Golubics | May 4, 1954 |
| 2,696,403 | Baugh | Dec. 7, 1954 |
| 2,700,572 | Torrance | Jan. 25, 1955 |
| 2,707,650 | Lawton | May 3, 1955 |
| 2,710,769 | Rosenthal | June 14, 1955 |
| 2,758,872 | Solomon et al. | Aug. 14, 1956 |
| 2,793,907 | Hess et al. | May 28, 1957 |
| 2,823,069 | Walker | Feb. 11, 1958 |

FOREIGN PATENTS

| 881,601 | France | Jan. 28, 1943 |
| 571,263 | Great Britain | Aug. 14, 1945 |
| 631,921 | Great Britain | Nov. 11, 1949 |

OTHER REFERENCES

"Line Has New Low-Priced Model," article in "Automotive Industries," vol. 102, No. 4, of Feb. 15, 1950, page 33.